Feb. 14, 1950            G. HUNT            2,497,357

LAND VEHICLE STEERING MECHANISM

Filed March 26, 1948            2 Sheets-Sheet 1

Inventor
Guss Hunt
By L. B. James
Attorney

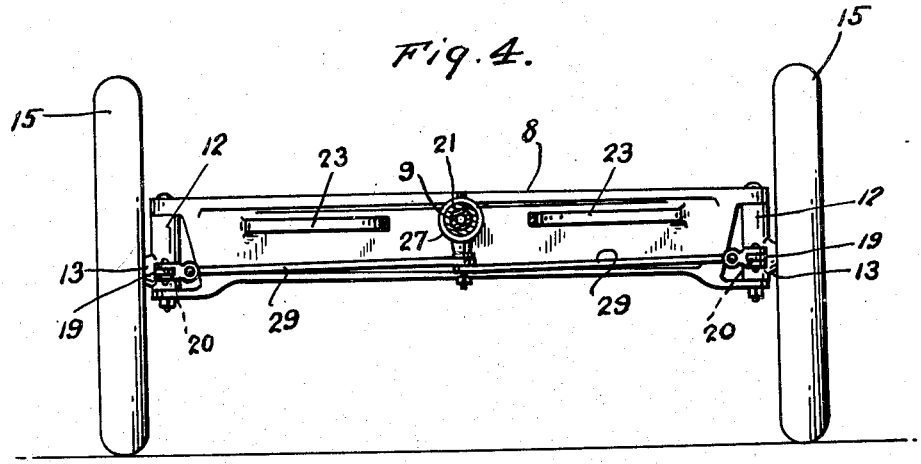
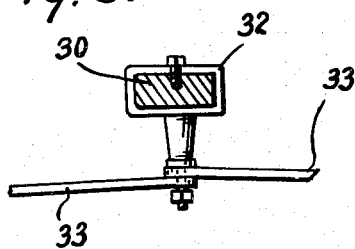
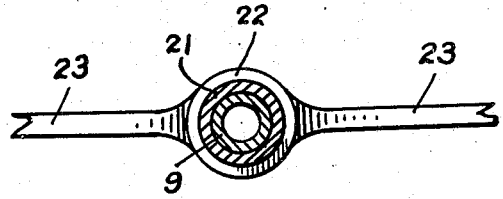
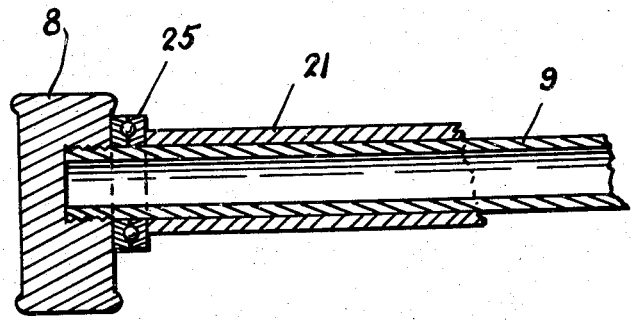

Patented Feb. 14, 1950

2,497,357

UNITED STATES PATENT OFFICE 2,497,357

LAND VEHICLE STEERING MECHANISM

Guss Hunt, Francisco, Ind.

Application March 26, 1948, Serial No. 17,213

1 Claim. (Cl. 280—99)

This invention relates to land vehicles and more particularly four wheel wagons.

The primary object of this invention resides in the provision of a four wheel wagon, truck and the like adapted to make short turns.

Another object of this invention resides in the provision of a four wheel ground vehicle adapted to make short turns through the instrumentality of means simultaneously operating both the front and rear wheels thereof in opposite directions.

A further object of this invention resides in the particular steering means connecting the rear wheels of the vehicle to the front wheels thereof.

With these and other objects in view, this invention resides in certain novel features of construction and arrangement of elements to be hereinafter more particularly set forth in the specification, illustrated in the accompanying drawing and pointed out in the appended claims and, although this disclosure depicts my present conception of the invention, the right is reserved to resort to such departures therefrom as come within the scope of the claim.

In the accompanying drawings forming a part of this application;

Fig. 4 is a cross sectional view taken approximately on line 4—4 of Fig. 2.

Fig. 5 is a cross sectional view taken approximately on line 5—5 of Fig. 2.

Fig. 6 is an enlarged sectional view taken approximately on line 6—6 of Fig. 2; Fig. 7 is an enlarged longitudinal sectional view through the rear axle and a portion of the reach pole.

Figure 1:
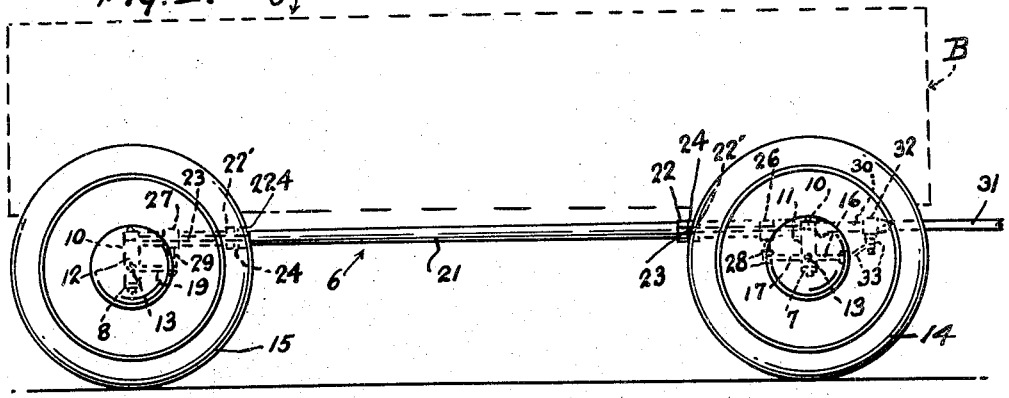
Fig. 1 is a side view of the vehicle showing the body thereof in dotted lines.
Figure 2:
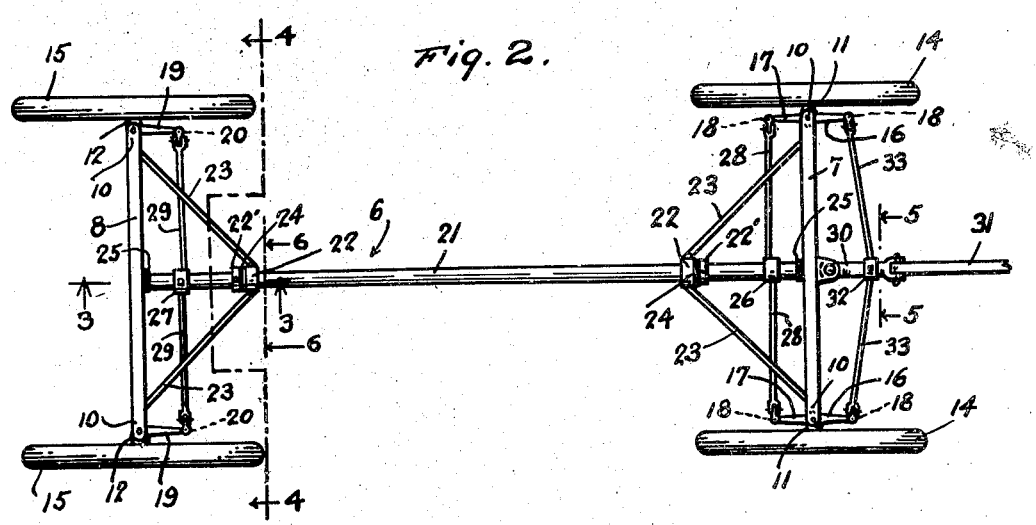
Fig. 2 is a plan view thereof.
Figure 3:
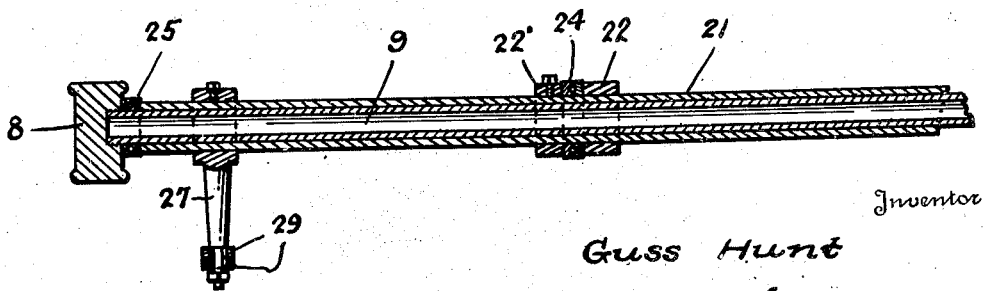
Fig. 3 is a longitudinal sectional view taken approximately on line 3—3 of Fig. 2.

In the present illustration of this invention, the numeral 5 designates, in general, a four wheel farm wagon or other similar ground vehicle consisting of a chassis 6 composed of front and rear axles 7 and 8 rigidly connected together by a stationary longitudinally extending cylindrical reach pole 9 and having their outer extensions formed with fork shape bearings 10 between which are journalled front and rear heads 11 and 12 of spindles 13 having front and rear wheels 14 and 15 rotatably secured thereto. Said front heads 11 of the spindles 13 are formed with forwardly and rearwardly extending arms 16 and 17 having their outer ends provided with apertures 18 while the rear heads 12 are formed with forwardly extending arms 19 provided with apertures 20.

Rotatably mounted on the cylindrical reach pole 9 is a longitudinally extending tube 21 which extends through cylindrical bearings 22 rigidly secured to the front and rear axles by brace rods 23.

Disposed on the tube 21 and retained against the aforesaid bearings 22 by collars 22' keyed thereon are anti-friction bearings 24 while similar anti-friction bearings 25 are mounted on the cylindrical reach pole between opposite ends of the tube and opposed sides of the front and rear axles.

Keyed or otherwise secured to the tube 21 adjacent its opposite ends are downwardly extending front and rear arms 26 and 27, the former being pivotally connected to the arms 17 by links 28 while the latter one is pivotally connected to the arms 19 by links 29.

Pivotally secured at its inner end to a suitable clevis 30 carried by the front axle is a draft tongue 31 which, in turn, is pivotally connected to the forwardly extending arms 16 through the instrumentality of a sleeve 32 secured thereto and links 33.

Mounted on the aforesaid chassis in the usual manner is a wagon body B indicated by dotted lines, however, any type of body may be substituted therefor.

Through the instrumentality of the aforesaid assemblage of elements, the front wheels of the vehicle are guided by the tongue and elements connecting the same to the heads of the front spindles, whereupon, the tube is rotated and the rear wheels are guided or turned in an opposite direction so as to follow that curved line upon which the front wheels are traversing, thus causing the vehicle to make a short turn.

Having thus described my invention, what I claim and desire to protect by Letters Patent is:

A four wheel land vehicle comprising, front and rear axles having fork shape outer ends, front and rear spindles including heads journalled between the fork shape ends of the axle, forwardly and rearwardly extending arms formed on the heads of the front spindles, forwardly extending arms formed on the heads of the rear spindles, a cylindrical reach pole rigidly connecting opposed inner surface of the front and rear axles, a tube rotatably mounted on the cylindrical reach pole with its opposite ends spaced from the front and rear axles, anti-friction bearings disposed on the reach pole between the ends of the tube and aforesaid axles, sleeves loosely surrounding the tube inwardly of the axles, diverging brace rods securing the sleeves to the axles, collars secured on the tube adjacent the front and rear sides of the sleeves, anti-friction bearings mounted on the tube between the aforesaid sleeves and collars, downwardly extending arms secured to the sleeve adjacent its opposite ends, oppositely extending links pivotally connecting the rearwardly extending arms of the front spindles to the forward arm of the tube, other oppositely extending links pivotally connecting the forwardly extending arms of the rear spindles to the rear downwardly extending arm on the tube, a draft bar pivotally connected to the front axle, and oppositely extending links pivotally connecting the draft bar to the forwardly extending arms of the front spindles.

GUSS HUNT.

REFERENCES CITED

The following references are of record in the file of this patent:

UNITED STATES PATENTS

| Number | Name | Date |
|---|---|---|
| 1,238,603 | Watkins | Aug. 28, 1917 |
| 1,276,422 | Scott et al. | Aug. 20, 1918 |
| 1,442,342 | Hines | Jan. 16, 1923 |
| 1,694,267 | King | Dec. 4, 1928 |
| 2,007,504 | Schelben | July 9, 1935 |